United States Patent [19]

Tanaka

[11] Patent Number: 4,776,680

[45] Date of Patent: Oct. 11, 1988

[54] HIGH RANGE ZOOM LENS OF REDUCED SIZE

[75] Inventor: Tsunefumi Tanaka, Kanagawa, Japan

[73] Assignee: Canon Kabushiki Kaisha, Tokyo, Japan

[21] Appl. No.: 859,646

[22] Filed: May 5, 1986

[30] Foreign Application Priority Data

May 11, 1985 [JP] Japan .................................. 60-100073
Aug. 17, 1985 [JP] Japan .................................. 60-180775

[51] Int. Cl.⁴ ........................ G02B 15/14; G02B 13/02
[52] U.S. Cl. ..................................... 350/427; 350/454
[58] Field of Search ............... 350/454, 455, 456, 427, 350/428, 458, 463, 469, 423, 426

[56] References Cited

U.S. PATENT DOCUMENTS 4,592,626 6/1986 Fujii ..................................... 350/427

Primary Examiner—John K. Corbin
Assistant Examiner—Ronald M. Kachmarik
Attorney, Agent, or Firm—Fitzpatrick, Cella, Harper & Scinto

[57] ABSTRACT

A zoom lens comprising two or more lens units axially movable for magnifying in front of a lens unit of negative power which remains stationary during zooming, wherein at least one of the magnifying lens units and the lens unit of negative power are simultaneously moved axially to effect focusing.

13 Claims, 14 Drawing Sheets

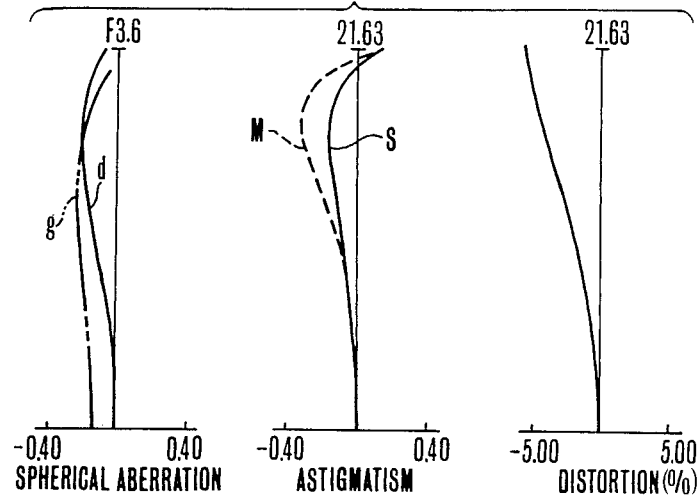
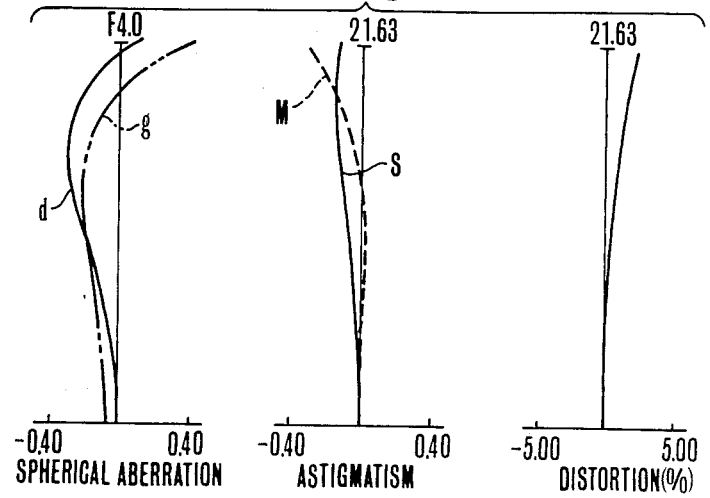
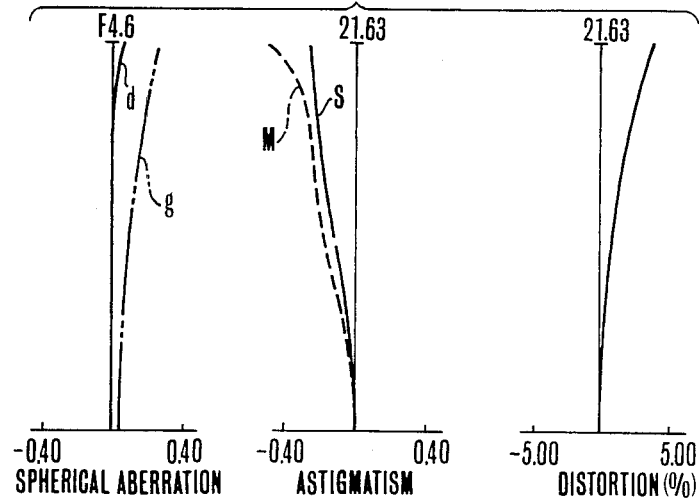

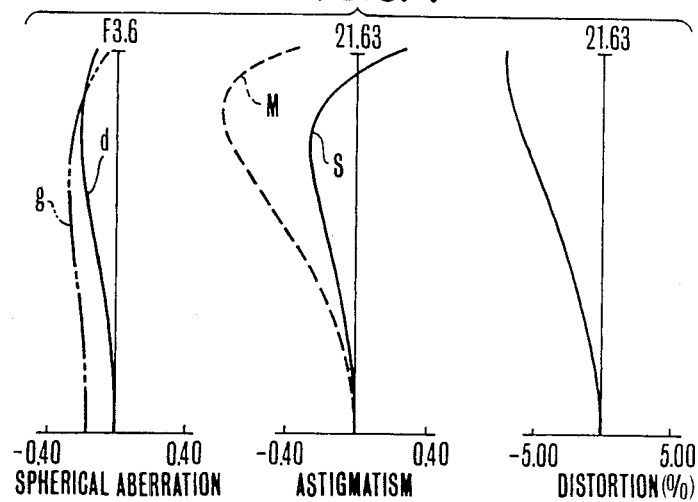
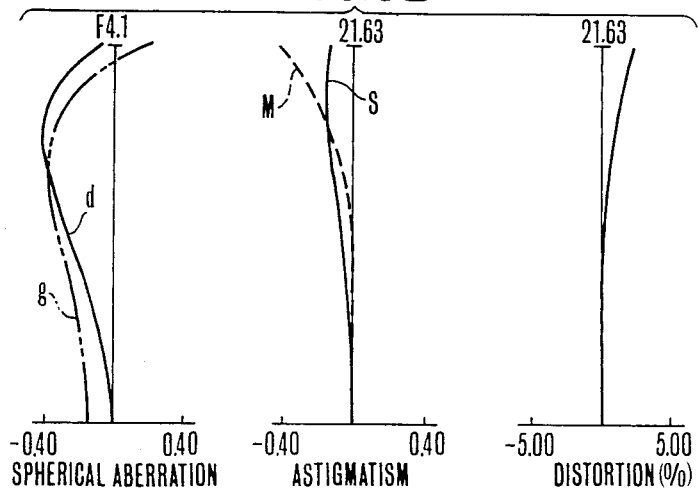
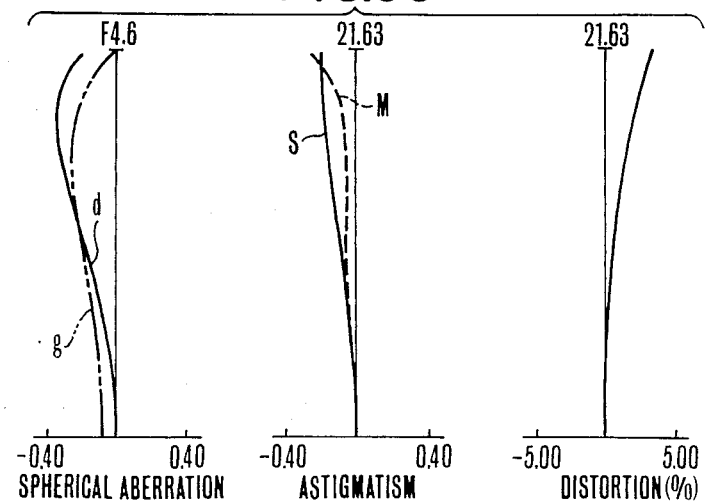

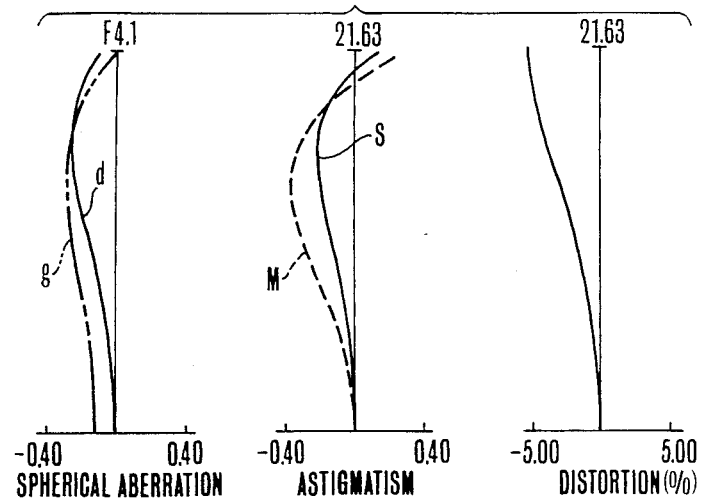
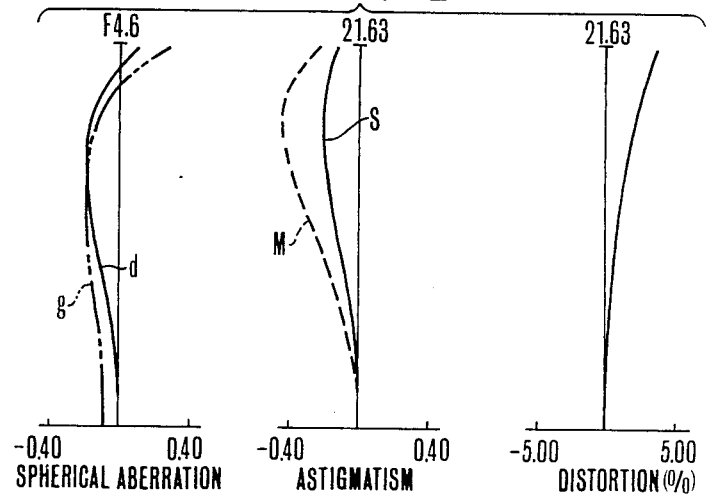
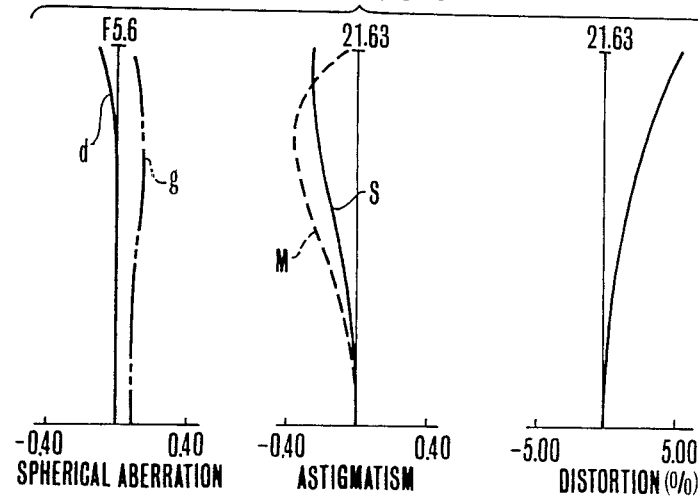

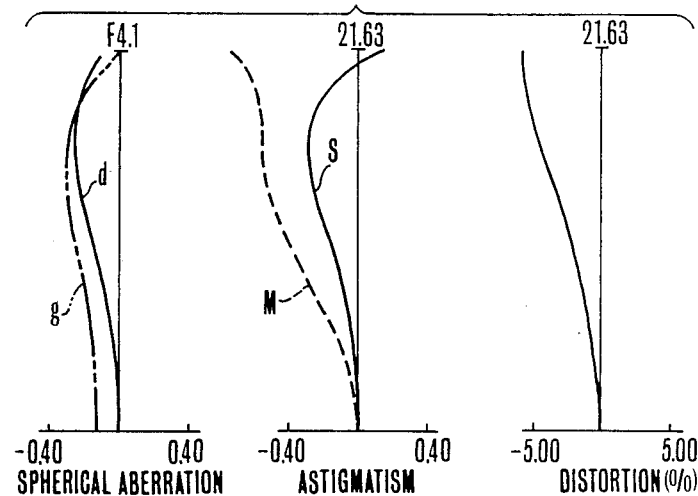
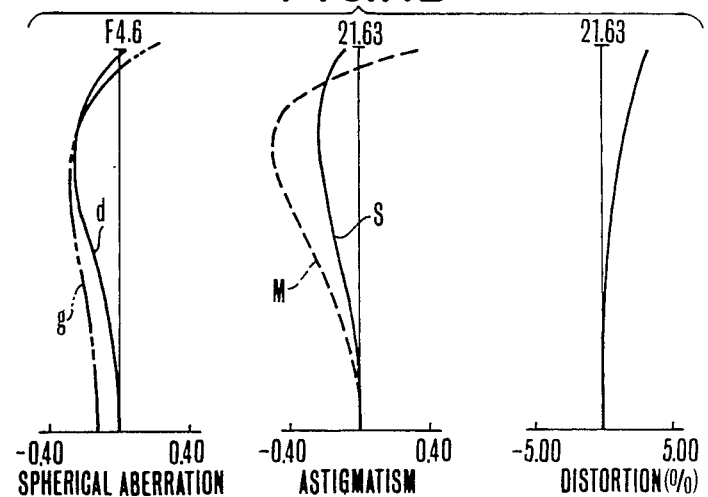
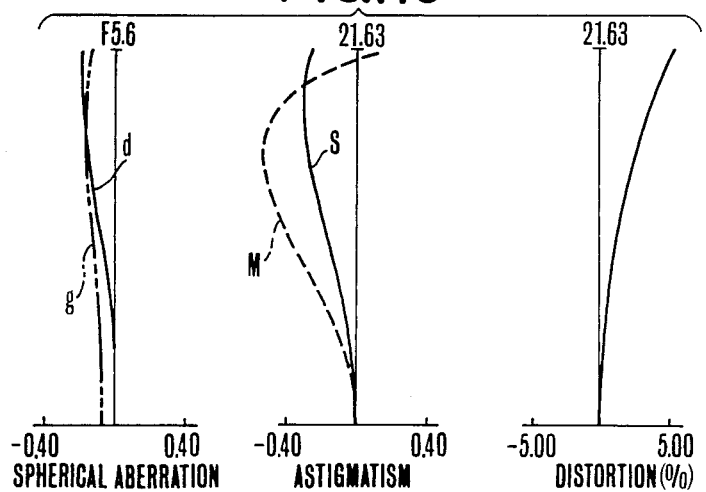

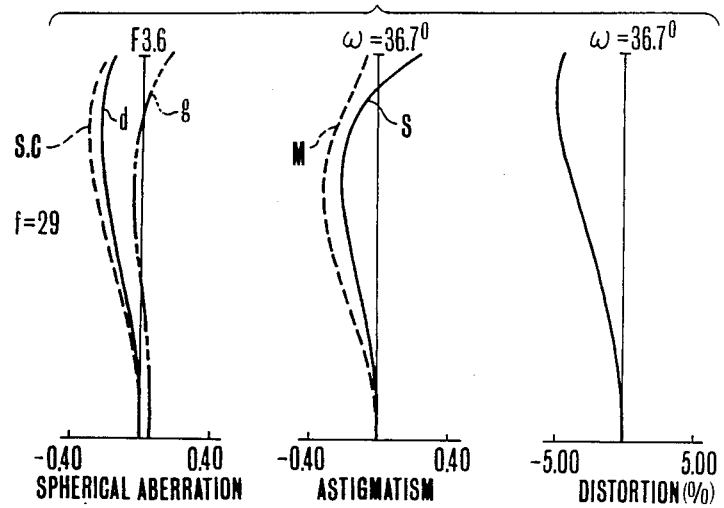
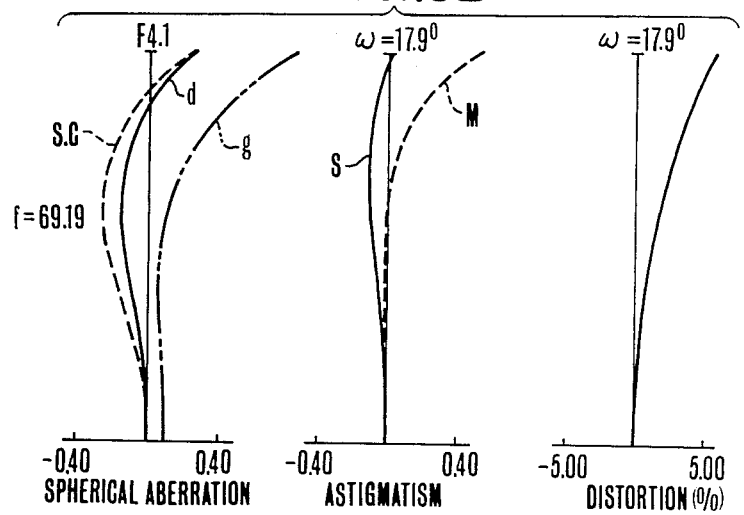
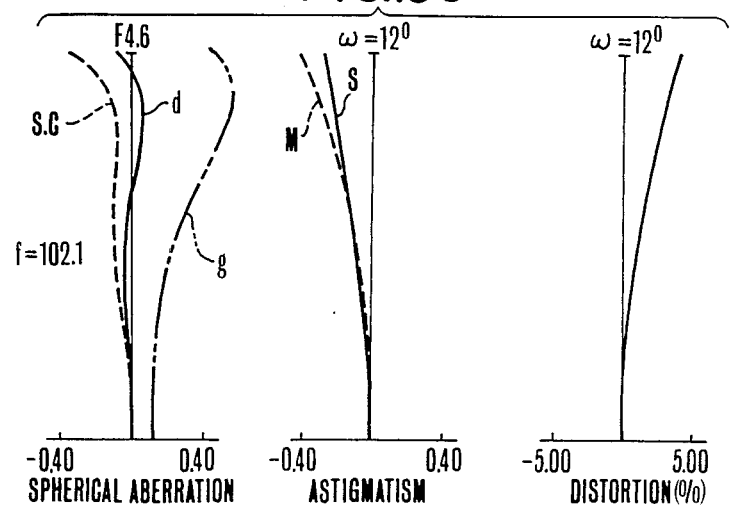

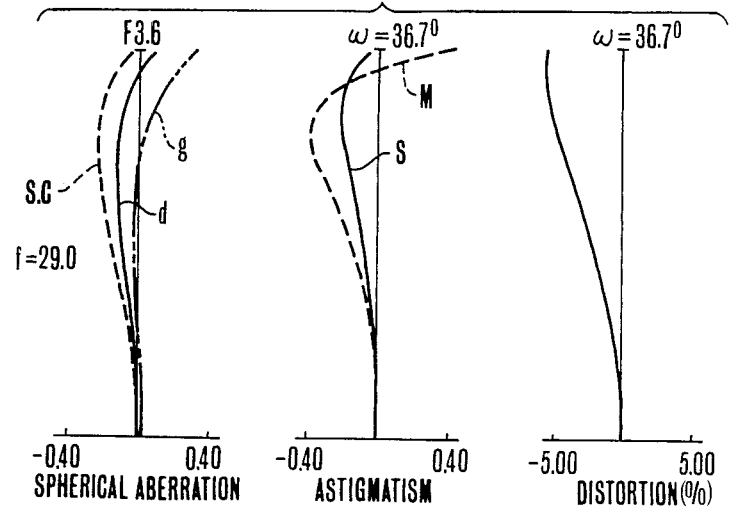
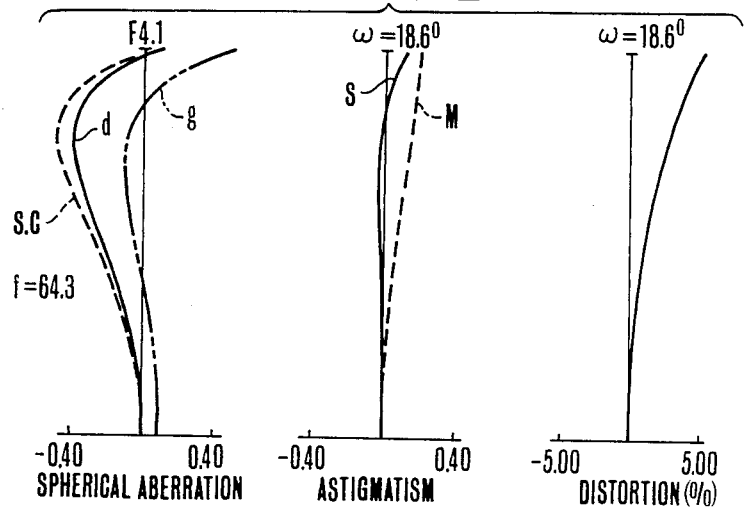
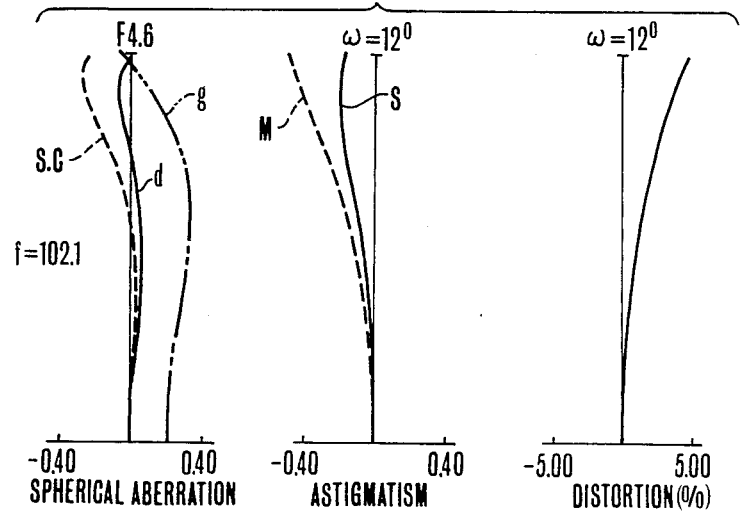

HIGH RANGE ZOOM LENS OF REDUCED SIZE

BACKGROUND OF THE INVENTION

1. Field of the Invention

This invention relates to zoom lenses, and more particularly to high range zoom lenses of reduced total length suited to still cameras, cine cameras or video cameras.

2. Description of the Prior Art

The cameras for photography and video cameras have demanded for zoom lenses of increased magnification ratio while still maintaining the total length of the lens at a minimum. To achieve an increase in the magnification ratio of the zoom lens, it has been customary to increase the total movement of the lens unit for varying the magnification, or to heighten the refractive power of the lens unit for varying the magnification, or to increase the number of lens units movable for zooming. However, these methods have been accompanied by drawbacks of increasing the total length of the system, raising variation of aberrations with zooming, and increasing the complexity of structure of the operating mechanism.

For example, Japanese Laid-Open Patent Application No. SHO 54-30855 discloses a zoom lens comprising three or four lens units, three of which are made movable for zooming to achieve an increase of the zoom ratio. Because of the increased number of movable lens units, the complexity of structure of the operating mechanism tended to increase.

Meanwhile, recently, a novel focusing method called "rear-focus" or "inner-focus" has been proposed. This method has advantages that the diameter of the outer lens barrel can be reduced, the weight of the focusing lens unit is so light as to accommodate the auto-focus capability, and the focusing speed is improved. However, in application of the "rear-focus" or "inner-focus" method to zoom lenses, there has been a problem that the focusing movement for the same object varies with variation of the focal length.

To lighten the above-described problem, according to the prior art in Japanese Laid-Open Patent Application No. SHO 58-91421, the image magnification of the lens unit movable for focusing is made variable. This method has been expanded in Japanese Laid-Open Patent Application No. SHO 58-136012 where two of the lens units which contribute to variation of the image magnification are made to move when focusing so that the change of the focusing movement resulting from the change of the focal length is controlled. Other previous proposals are for moving two lens units at different speeds from each other when focusing as in Japanese Laid-Open Patent Application Nos. SHO 58-98720, 58-211117, 58-211118, and for moving two or three lens units which when zooming move in differential relation, as a unit when focusing, as desclosed in Japanese Laid-Open Patent Application Nos. SHO 60-39613 and 60-14212.

The above-described proposals each have amied at how the focusing movement is less affected by the zooming position. In actual practice, however, as consideration must be taken up to the lens mounting mechanism, its operation and driving, the situation is complicated, the weight of the focusing lens unit or units is heavy, and the size of the focusing unit including an operating mechanism for controlling the complicated focusing movement becomes very large. In Japanese Laid-Open Patent Application No. SHO 60-43619, there is proposed a focusing mechanism for three lens units of complicated movement.

SUMMARY OF THE INVENTION

A first object of the invention is to provide a zoom lens of high range of image magnifications.

A second object is to provide a compact zoom lens.

A third object is to make it possible to speed up focusing.

A fourth object is to enable the focusing to be performed without increasing the complexity of structure of the operating mechanism.

BRIEF DESCRIPTION OF THE DRAWINGS

FIGS. 8A to 8C are aberration curves of the second embodiment with an object at infinity.

FIGS. 9A to 9C are aberration curves with an object at the minimum distance (1.5 m).

FIGS. 10A to 10C are aberration curves of the third embodiment with an object at infinity.

Figs. 11A to 11C are aberration curves with an object at the minimum distance.

FIGS. 15A to 15C are aberration curves of the fifth embodiment in the wide angle, middle and telephoto positions with an object at infinity.

FIGS. 16A to 16C are aberration curves of the sixth embodiment in the wide angle, middle and telephoto positions with an object at infinity.

DETAILED DESCRIPTION OF THE PREFERRED EMBODIMENTS

Figure 1:
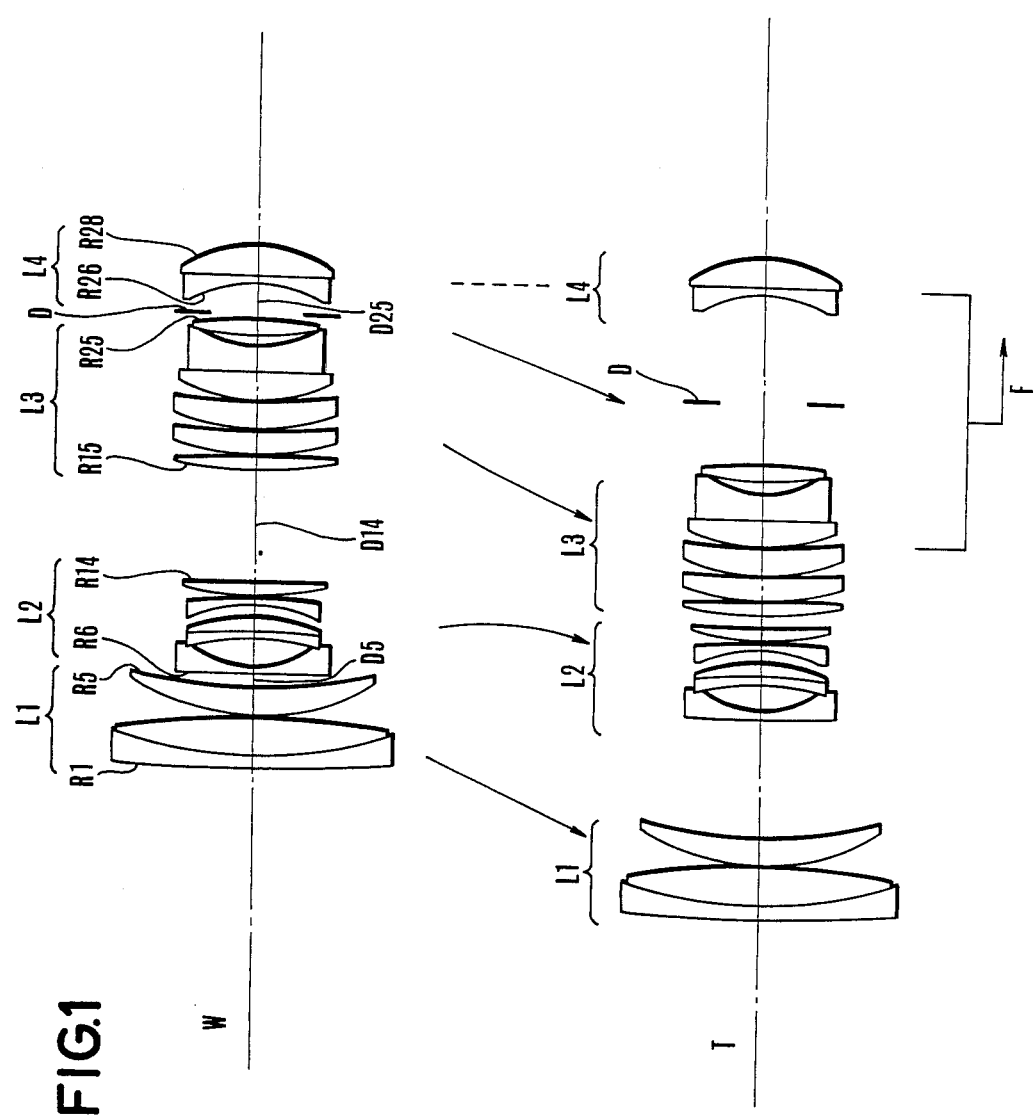
FIG. 1 is longitudinal section views of a first embodiment of a zoom lens according to the invention.
Figure 3:
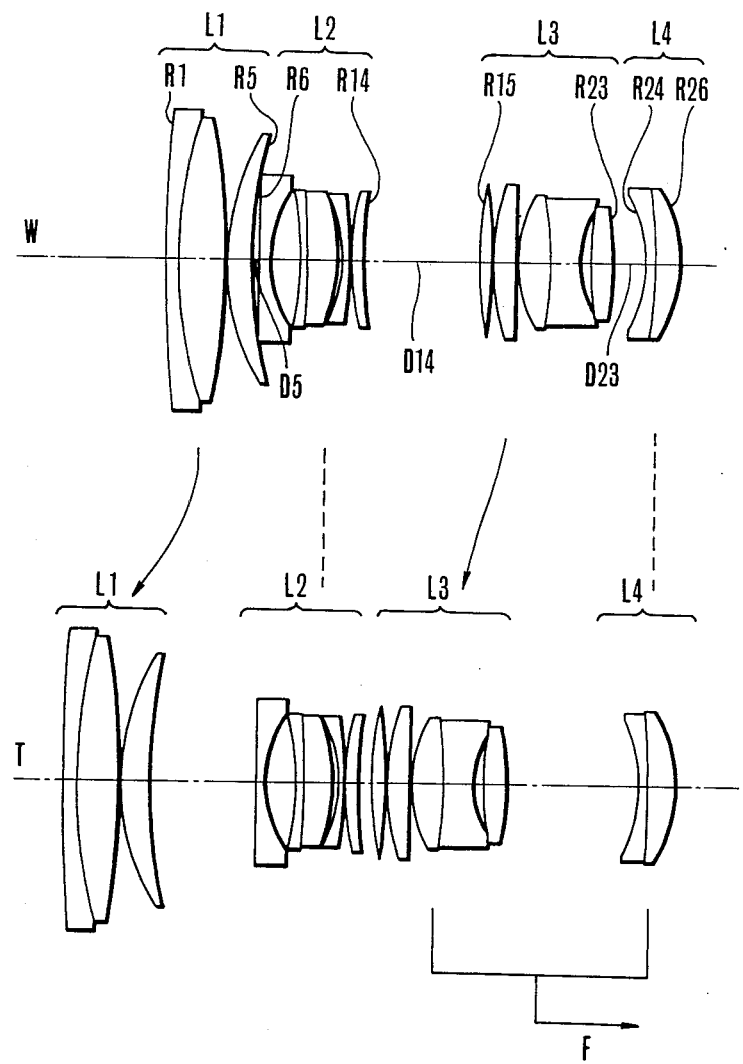
FIG. 3 is longitudinal section views of a second embodiment of the zoom lens.
Figure 4:
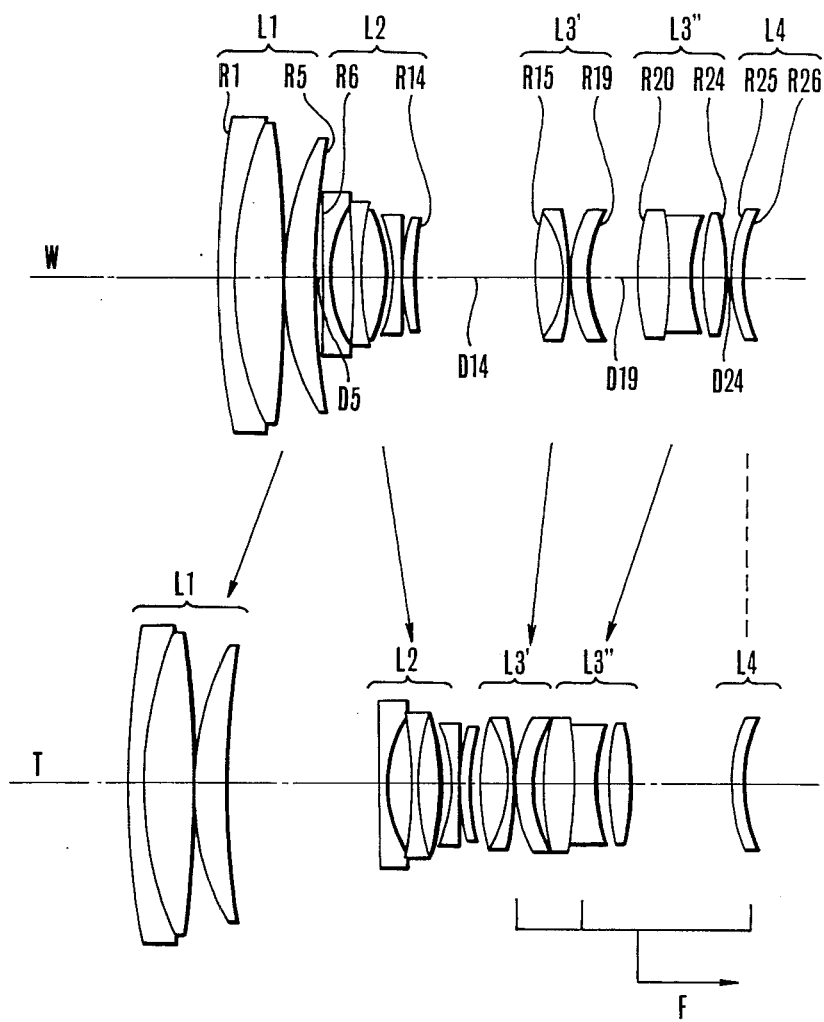
FIG. 4 is longitudinal section views of a third embodiment of the zoom lens.
Figure 6A:
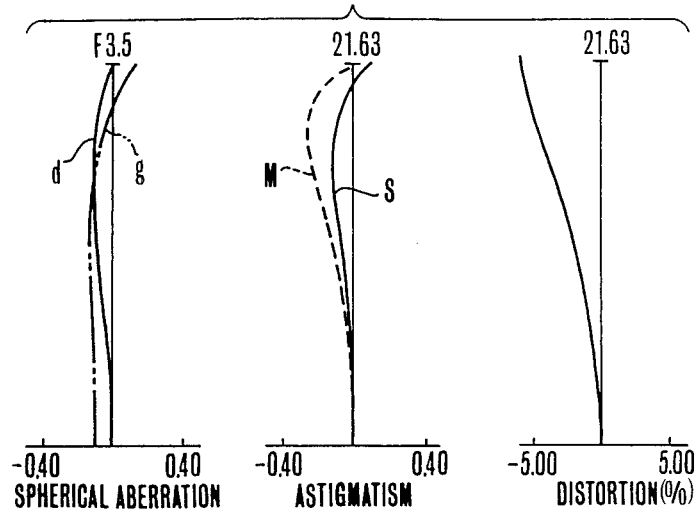
FIGS. 6A to 6C are aberration curves of the first embodiment in the wide angle, middle and telephoto positions with an object at infinity.
Figure 6B:
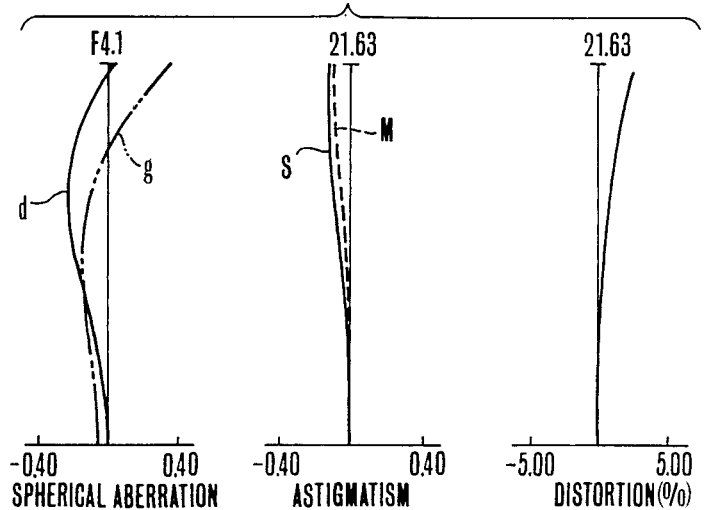
Figure 6C:
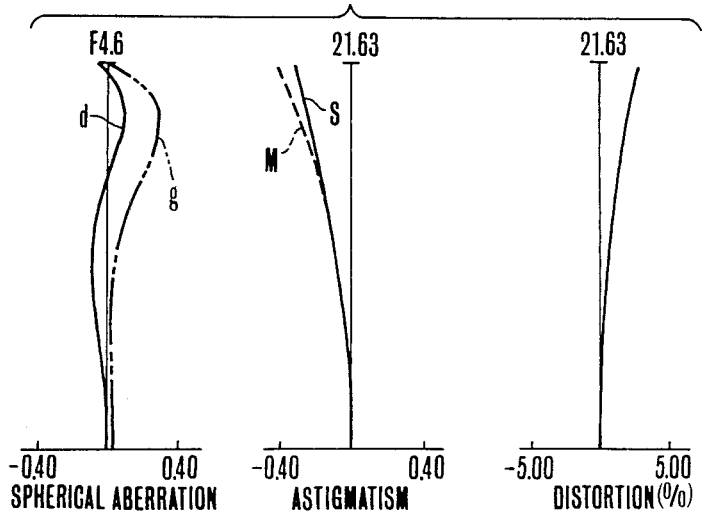
Figure 7A:
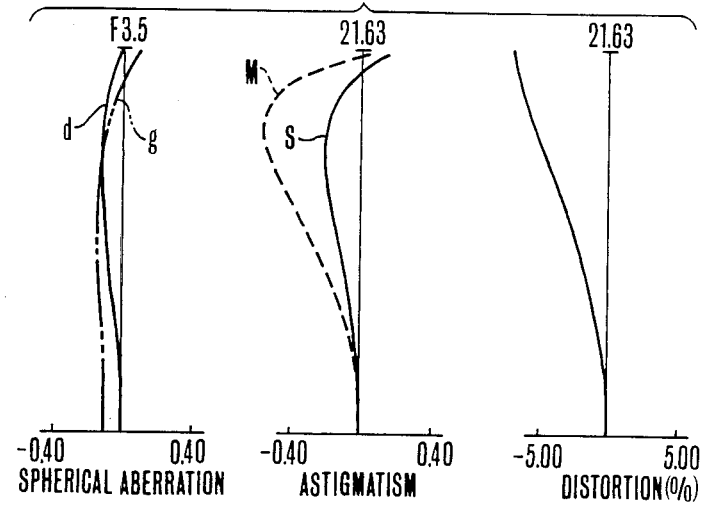
FIGS. 7A to 7C are aberration curves in the wide angle, middle and telephoto positions with an object at the minimum distance.
Figure 7B:
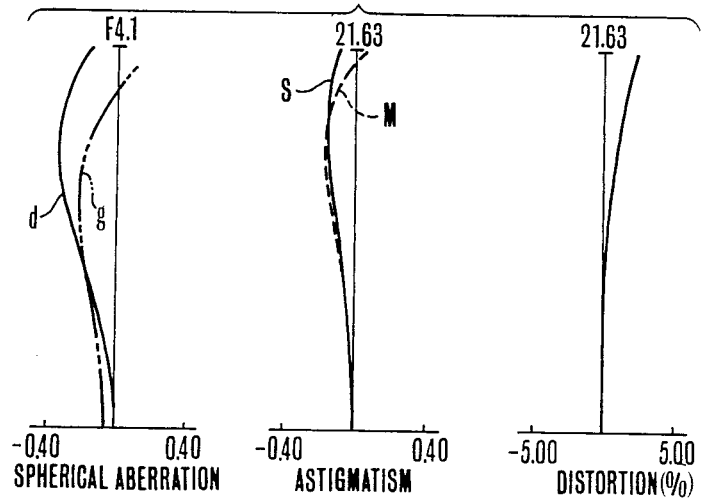
Figure 7C:
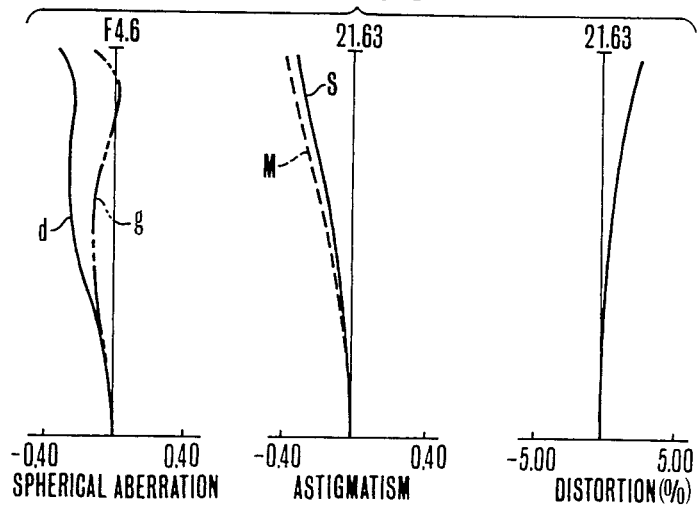
Figure 12:
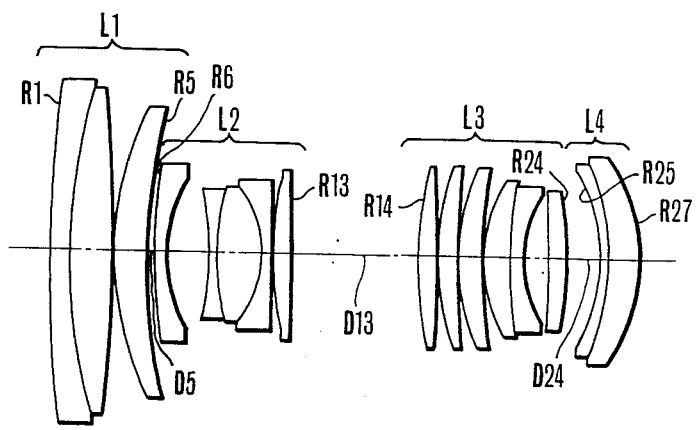
FIG. 12 is a longitudinal section view of a fourth embodiment of the zoom lens.
Figure 13:
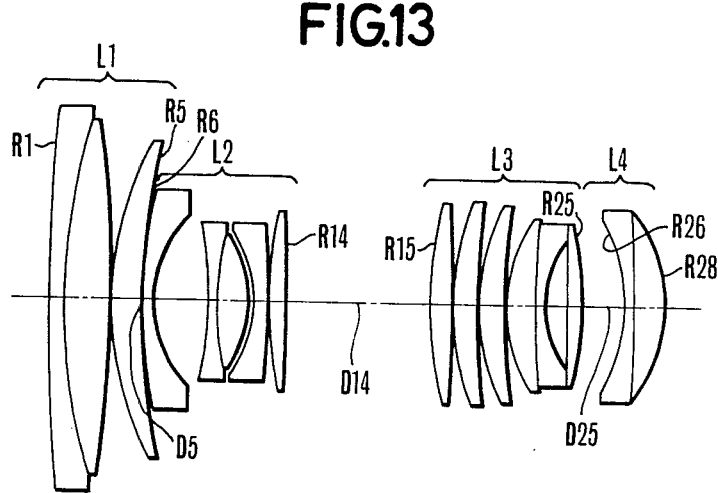
FIG. 13 is a longitudinal section view of a fifth embodiment of the zoom lens.
Figure 14A:
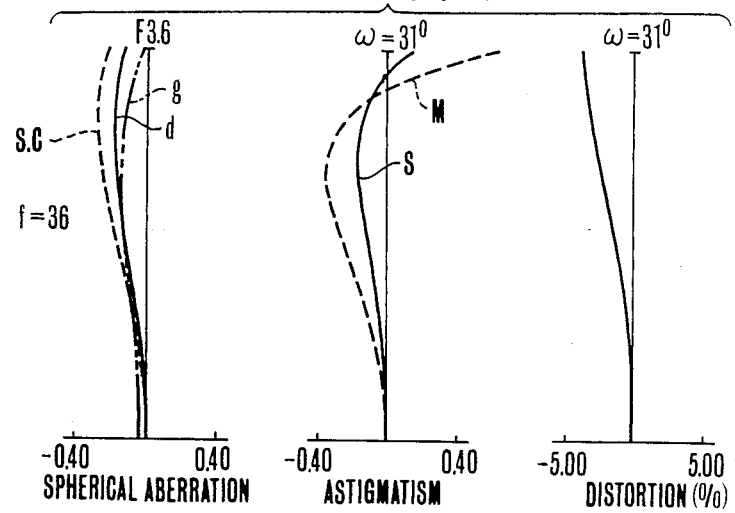
FIGS. 14A to 14C are aberration curves the fourth embodiment in the wide angle, middle and telephoto positions with an object at infinity.
Figure 14B:
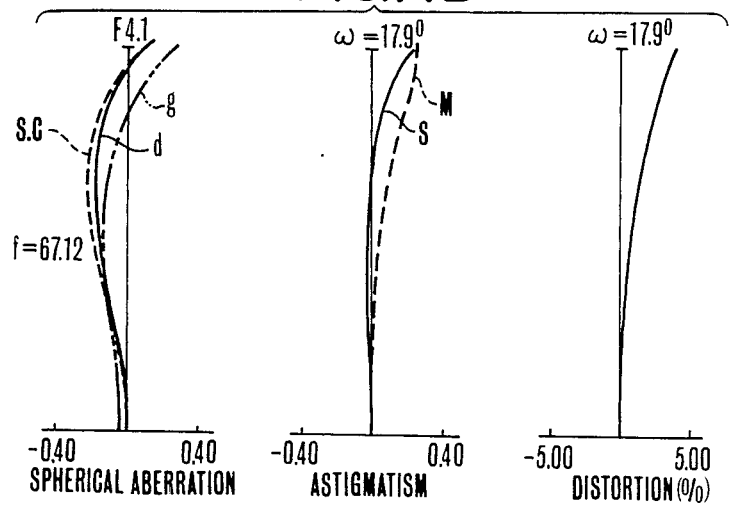
Figure 14C:
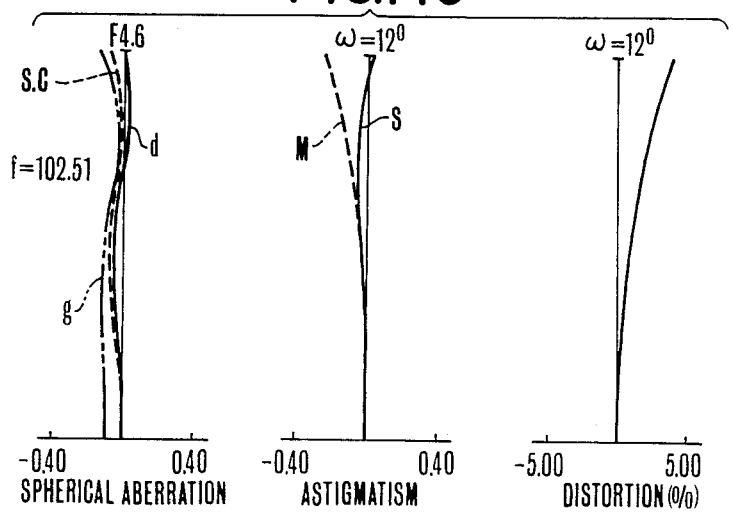

In the zoom lenses shown in FIGS. 1, 3 and 4, in order to lighten the difference in the focusing movement, at least two lens units between which the spacing, or those lateral magnifications, is or are variable are made to move simultaneously, preferably in unison with a greater advantage.

By making at least one of the lens units movable for zooming and a lens unit which remains stationary during zooming arranged to move as a unit for focusing purposes, the lens units movable for focusing can be simplified.

Preferably, of the lens units movable for zooming, one lens unit arranged in the rearmost position, and the fixed lens unit adjacent thereto are made to move in unison. This is the arrangement for most simplifying the barrel. But, in the case of zoom lenses of large zoom ratio, there is need to perform focusing by two lens units for zooming and the fixed lens unit.

If the composite refractive power of the focusing lens units increases as zooming from the wide angle side to the telephoto side, the difference of the focusing movement can be reduced. For example, when the lens unit having both functions of zooming and focusing is one in number, and this unit has an aim of increasing the magnification, in the case of this unit having a positive refractive power, it must be moved forward as zooming from the wide angle side to the telephoto side, and, in the case of the negative refractive power, it must be moved rearward. For note, in both cases, it is when the refractive power of the fixed lens unit is negative that the composite refractive power of the focusing lens units increases.

Therefore, the lens unit that remains stationary during zooming and moves when focusing has a negative refractive power. In case when the negative lens unit lies at the rearmost side of the zoom lens system, the telephoto type is formed as a whole. Because this shortens the total length of the lens, there is also an advantage of realizing a compact zoom lens system. So, the fixed lens unit has not only the function of focusing, but also a function of reducing the size of the entire system.

Next, a method for not largely changing the forward axial movement of focusing for the same object despite the focal length changes, and how to determine the paraxial arrangement are explained.

Now, the distance to the object is denoted by x and the focal length by f. Then, the amount of focus deviation, y, for being focused at infinity is $$y = f^2/x$$

Therefore, upon zooming, the amount of focus deviation y changes as the square of the focal length. By the way, the degree of responsiveness of the focusing lens, that is, the amount of effect at the image plane position to the forward axial movement of focusing is $$1 - \beta_F^2$$

where $\beta_F$ is the lateral magnification of the focusing lens.

From the above, it follows that in order to remove the difference between the forward axial movements in the wide angle and telephoto sides, the various dimensions of the construction may be determined so as to satisfy $$1 - \beta_{FT}^2 \simeq (f_T/f_W)^2(1 - \beta_{FW}^2)$$

where $f_W$ is the shortest focal length, $f_T$ is the longest focal length, and $\beta_{FW}$ and $\beta_{FT}$ are the lateral magnifications on the wide angle and telephoto sides respectively. Further, each zoom lens is explained in detail by reference to the drawing.

FIG. 1 depicts a first embodiment of the invention. The zoom lens comprises, from front to rear, a first lens unit L1 of positive refractive power, a second lens unit L2 of negative refractive power, a third lens unit L3 of positive refractive power, a diaphragm D for determining the F-number, (the lens units L1, L2 and L3 and the diaphragm D constituting a zoom section), and a fourth lens unit L4 of negative refractive power, the first lens unit L1, second lens unit L2 and third lens unit L3 moving simultaneously and independently of each other to effect zooming, and the fourth lens unit L4 being held stationary during zooming. Also, for focusing purposes, the third lens unit L3 and the fourth lens unit L4 are axially moved as a unit, while the first lens unit L1 and the second lens unit L2 being held stationary. The composite refractive power of the third lens unit L3 and the fourth lens unit L4 is positive.

Figure 2:
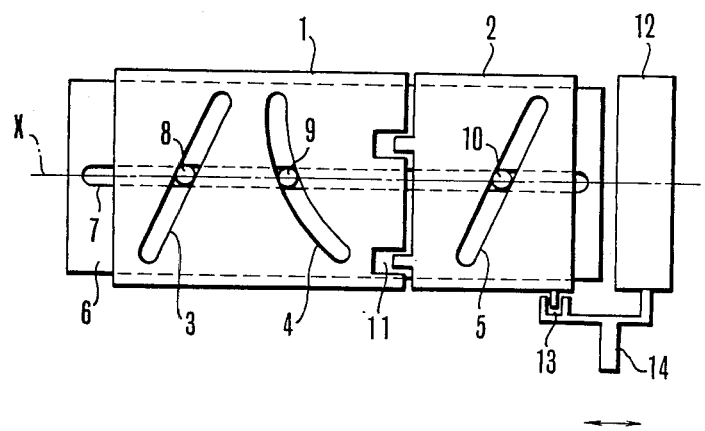
FIG. 2 is an elevational view of an operating mechanism.

FIG. 2 illustrates an operating mechanism for moving all the lens units for zooming and focusing purposes. In the drawing, a first barrel 1 is provided with camming slots 3 and 4 for controlling the zooming positions. A second barrel 2 is provided with another camming slot 5 for controlling the zooming position. A fixed barrel 6 is provided with a linear camming slot 7 for guide parallel to an optical axis X. Drive pins 8, 9 and 10 are arranged at respective cross points of the camming slots 3, 4 and 5 with the linear camming slot 7, and connected respectively to the first lens unit L1, the second lens unit L2 and the third lens unit L3. A key of the second barrel 2 and a groove of the first barrel 1 constitute a key-groove mechanism 11 which rotates the first barrel 1 and the second barrel 2 as a unit, while enabling the second barrel 2 to move to the direction of the optical axis X when the first barrel 1 is fixed. A rear barrel 12 holds the fourth lens unit L4. A second key-groove mechanism 13 in which an extension provided along the outer periphery of the barrel engages in a groove, so that the second barrel 2 freely rotates about the optical axis, but when it moves to the direction of the optical axis, the rear barrel 12 is constrained so as to move as a unit therewith. 14 is a focusing lever.

In the above arrangement, when a zoom ring (not shown) is operated, the first barrel 1 rotates, and, by the action of the key-groove mechanism 11, the second barrel 2 also rotates, so that the drive pins 8, 9 and 10 position-controlled by the camming slots 3, 4 and 5 move the respective lens units L1, L2 and L3 so as to fulfill a prescribed relationship. Also when focusing, the lever 14 is moved back and forth manually or by a driver of an automatic focus adjusting device (not shown) so that the second barrel 2 and the rear barrel 12 move as a unit back and forth, moving the third lens unit L3 and the fourth lens unit L4 as a unit so that it becomes possible to focus on an object to be photographed. And, the position of the third lens unit L3 determined according to the zooming has, since the various dimensions of the construction are defined so that the refractive power determined by the relationship of this lens unit L3 and the fourth lens unit L4 becomes the same forward movement in each zooming position, good convenience on operation.

FIG. 3 is a scond embodiment, especially representing that a variation of the zoom section is possible. In the drawing, L1 is a first lens unit of positive refractive power, L2 is a second lens unit of negative refractive power which is held stationary during zooming, L3 is a third lens unit of positive refractive power, and L4 is a fourth lens unit of negative refractive power which is held stationary during zooming, being arranged in this order from the front. When zooming, the first lens unit L1 and the third lens unit L3 move simultaneously and independently. When focusing F, the third lens unit L3 and the fourth lens unit L4 move in unison.

The third lens unit L3 when changed over from the wide angle to the telephoto moves so as to occupy the obect side position, and the separation from the fourth lens unit L4 enlarges so that the refractive power increases.

FIG. 4 is a third embodiment, illustrating an example of variation of the lens unit movable for focusing. L1 is a first lens unit of positive refractive power, L2 is a second lens unit of negative refractive power, L3' is a third-1 lens unit of positive refractive power, L3" is another or third-2 lens unit of positive refractive power, L4 is a fourth lens unit of negative refractive power which is held stationary during zooming. For note, if the composite refractive power of the third-1 lens unit L3' and the third-2 lens unit L3" is positive, one of them may be of negative refractive power. When zooming, the first lens unit L1 to the third-2 lens unit L3" are moved. When focusing, the third-1 lens unit L3' to the fourth lens unit L4 are moved in unison.

Figure 5:
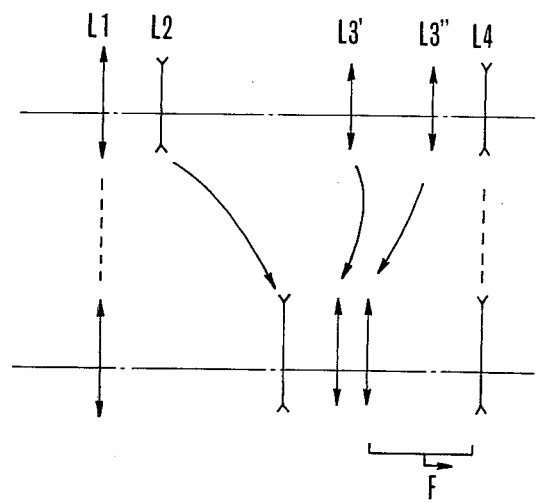
FIG. 5 is a schematic diagrams of the paraxial arrangement of an example of variation.

FIG. 5 is a diagram of the paraxial arrangement illustrating an example of variation of the zoom section. Successively arranged are a positive first lens unit L1, a negative second lens unit L2, a positive third-1 lens unit L3', a positive third-2 lens unit L3" and a positive fourth lens unit L4. For zooming purpose, the second lens unit L2 to the third-2 lens unit L3" are moved. For focusing purpose, the third-2 lens unit L3" and the fourth lens unit L4 are moved.

For note, in the above-described embodiments, by moving only the second lens unit L2 out of the ordinary zooming locus, it is possible to focus on a super close object.

In the following numerical examples are explained. In each example, F is the focal length, Ri is the radius of curvature of the lens surface, Di is the lens thickness or lens surface separation, Ni is the refractive index for the d-line, and $\nu i$ is the Abbe number.

Also, the construction, so to speak, that the lens unit movable for zooming also moves when focusing as in the present invention makes the aberration correction difficult, and, therefore, is liable to increase the number of lens elements. So it is effective to introduce an aspherical surface.

The shape of the aspherical surface is expressed by the equation:

$$X = \frac{(1/R) H^2}{1 + \sqrt{1 - (H/R)^2}} + AH^2 + BH^4 + CH^6 + DH^8 + EH^{10}$$

where X-axis is in the direction of the optical axis, H-axis is in the direction perpendicular to the optical axis, the direction of advance of light is taken as positive, R is the radius of paraxial curvature, and A, B, C, D and E are the aspherical coefficients.

Numerical Example 1
(See FIG. 1, FIGS. 6A-6C, FIGS. 7A-7C)
F = 36.0–102.47   FNO = 1:3.5–4.6   $2\omega$ = 62°–23.8°

| | | | |
|---|---|---|---|
| R1 = 402.301 | D1 = 2.25 | N1 = 1.80518 | $\nu 1$ = 25.4 |
| R2 = 30.908 | D2 = 6.20 | N2 = 1.60311 | $\nu 2$ = 60.7 |
| R3 = −132.900 | D3 = 0.12 | | |
| R4 = 37.284 | D4 = 4.40 | N3 = 1.60311 | $\nu 3$ = 60.7 |
| R5 = 78.505 | D5 = 2.34-14.59-19.62 | | |
| R6 = 307.079 | D6 = 1.20 | N4 = 1.77250 | $\nu 4$ = 49.6 |
| R7 = 16.503 | D7 = 4.72 | | |
| R8 = −41.362 | D8 = 1.20 | N5 = 1.83481 | $\nu 5$ = 42.7 |
| R9 = −142.326 | D9 = 2.49 | N6 = 1.80518 | $\nu 6$ = 25.4 |
| R10 = −28.540 | D10 = 2.01 | | |
| R11 = −22.115 | D11 = 1.20 | N7 = 1.80400 | $\nu 7$ = 46.6 |
| R12 = −229.752 | D12 = 0.10 | | |

-continued

| | | | |
|---|---|---|---|
| R13 = 49.292 | D13 = 2.13 | N8 = 1.84666 | $\nu 8$ = 23.9 |
| R14 = 632.424 | D14 = 19.15-6.08-1.17 | | |
| R15 = 61.717 | D15 = 2.44 | N9 = 1.62299 | $\nu 9$ = 58.2 |
| R16 = −465.204 | D16 = 0.12 | | |
| R17 = 43.205 | D17 = 3.92 | N10 = 1.60311 | $\nu 10$ = 60.7 |
| R18 = 258.021 | D18 = 0.12 | | |
| R19 = 32.179 | D19 = 4.73 | N11 = 1.60311 | $\nu 11$ = 60.7 |
| R20 = 85.896 | D20 = 0.12 | | |
| R21 = 28.074 | D21 = 4.84 | N12 = 1.51633 | $\nu 12$ = 64.1 |
| R22 = −4816.512 | D22 = 4.15 | N13 = 1.84666 | $\nu 13$ = 23.9 |
| R23 = 17.914 | D23 = 1.84 | | |
| R24 = 37.797 | D24 = 3.00 | N14 = 1.62004 | $\nu 14$ = 36.3 |
| R25 = −57.077 | D25 = 5.56-19.06-28.06 | | |
| R26 = −24.077 | D26 = 1.50 | N15 = 1.77250 | $\nu 15$ = 49.6 |
| R27 = 966.800 | D27 = 5.00 | N16 = 1.53256 | $\nu 16$ = 45.9 |
| R28 = −21.541 | | | |

The aspherical coefficients B and C for the aspherical 8th and 25th surfaces have the following values:

$B_8 = 8.75 \times 10^{-7}$   $C_8 = -8.04 \times 10^{-9}$
$B_{25} = 1.05 \times 10^{-5}$   $C_{25} = 1.33 \times 10^{-8}$ Numerical Example 2
(FIG. 3, FIGS. 8A-8C, FIGS. 9A-9C)
F = 36.36–101.85   FNO = 1:3.6–4.6   $2\omega$ = 61.5°–24.0°

| | | | |
|---|---|---|---|
| R1 = 291.218 | D1 = 2.25 | N1 = 1.80518 | $\nu 1$ = 25.4 |
| R2 = 79.839 | D2 = 7.61 | N2 = 1.60311 | $\nu 2$ = 60.7 |
| R3 = −127.578 | D3 = 0.12 | | |
| R4 = 36.191 | D4 = 4.53 | N3 = 1.60311 | $\nu 3$ = 60.7 |
| R5 = 80.092 | D5 = 1.55-10.82-18.62 | | |
| R6 = 638.971 | D6 = 1.20 | N4 = 1.80400 | $\nu 4$ = 46.6 |
| R7 = 18.112 | D7 = 5.75 | | |
| R8 = −52.935 | D8 = 1.20 | N5 = 1.83481 | $\nu 5$ = 42.7 |
| R9 = −123.756 | D9 = 4.78 | N6 = 1.80518 | $\nu 6$ = 25.4 |
| R10 = −29.306 | D10 = 1.03 | | |
| R11 = −22.733 | D11 = 1.20 | N7 = 1.80400 | $\nu 7$ = 46.6 |
| R12 = −134.649 | D12 = 0.09 | | |
| R13 = 41.061 | D13 = 2.20 | N8 = 1.84666 | $\nu 8$ = 23.9 |
| R14 = 81.242 | D14 = 19.27-8.20-1.97 | | |
| R15 = 49.160 | D15 = 2.54 | N9 = 1.65160 | $\nu 9$ = 58.6 |
| R16 = −128.234 | D16 = 0.10 | | |
| R17 = 34.837 | D17 = 4.40 | N10 = 1.65160 | $\nu 10$ = 58.6 |
| R18 = −3679.667 | D18 = 0.10 | | |
| R19 = 22.199 | D19 = 5.08 | N11 = 1.51454 | $\nu 11$ = 54.7 |
| R20 = −68.754 | D20 = 5.30 | N12 = 1.85026 | $\nu 12$ = 32.3 |
| R21 = 16.091 | D21 = 1.85 | | |
| R22 = 54.986 | D22 = 4.04 | N13 = 1.60311 | $\nu 13$ = 60.7 |
| R23 = −41.560 | D23 = 5.07-16.14-22.37 | | |
| R24 = −22.304 | D24 = 1.50 | N14 = 1.80400 | $\nu 14$ = 46.6 |
| R25 = −100.867 | D25 = 5.00 | N15 = 1.57135 | $\nu 15$ = 53.0 |
| R26 = −21.209 | | | |

Numerical Example 3
(FIG. 4, FIGS. 10A-10C, FIGS. 11A-11C)
F = 36.4–131.36   FNO = 1:4.1–5.6   $2\omega$ = 61.45°–18.64°

| | | | |
|---|---|---|---|
| R1 = 163.549 | D1 = 2.25 | N1 = 1.80518 | $\nu 1$ = 25.4 |
| R2 = 59.513 | D2 = 8.20 | N2 = 1.60311 | $\nu 2$ = 60.7 |
| R3 = −240.854 | D3 = 0.10 | | |
| R4 = 42.694 | D4 = 5.80 | N3 = 1.60311 | $\nu 3$ = 60.7 |
| R5 = 155.008 | D5 = 0.97-14.04-26.21 | | |
| R6 = 797.687 | D6 = 1.20 | N4 = 1.30400 | $\nu 4$ = 46.6 |
| R7 = 19.650 | D7 = 4.20 | | |
| R8 = −79.470 | D8 = 1.20 | N5 = 1.83481 | $\nu 5$ = 42.7 |
| R9 = 40.861 | D9 = 4.50 | N6 = 1.75520 | $\nu 6$ = 27.5 |
| R10 = −27.248 | D10 = 1.20 | | |
| R11 = −24.481 | D11 = 1.20 | N7 = 1.80400 | $\nu 7$ = 46.6 |
| R12 = 211.300 | D12 = 0.10 | | |
| R13 = 31.710 | D13 = 2.00 | N8 = 1.84666 | $\nu 8$ = 23.9 |
| R14 = 45.503 | D14 = 21.02-11.59-1.81 | | |
| R15 = 48.447 | D15 = 4.80 | N9 = 1.53113 | $\nu 9$ = 62.4 |
| R16 = −18.113 | D16 = 1.00 | N10 = 1.80610 | $\nu 10$ = 40.9 |
| R17 = −40.797 | D17 = 0.10 | | |
| R18 = 22.436 | D18 = 2.86 | N11 = 1.84666 | $\nu 11$ = 23.9 |
| R19 = 21.029 | D19 = 8.63-4.47-1.73 | | |
| R20 = 36.486 | D20 = 5.36 | N12 = 1.80610 | $\nu 12$ = 40.9 |

-continued

Numerical Example 3
(FIG. 4, FIGS. 10A-10C, FIGS. 11A-11C)
F = 36.4-131.36  FNO = 1:4.1-5.6  2ω = 61.45°-18.64°

| | | | |
|---|---|---|---|
| R21 = −34.391 | D21 = 3.45 | N13 = 1.69895 | ν13 = 30.1 |
| R22 = 23.871 | D22 = 2.49 | | |
| R23 = 43.453 | D23 = 3.80 | N14 = 1.60311 | ν14 = 60.7 |
| R24 = −52.242 | D24 = 1.00-10.88-17.38 | | |
| R25 = 28.160 | D25 = 1.78 | N15 = 1.60311 | ν15 = 60.7 |
| R26 = 23.880 | | | |

Further, from the point of view of aberration correction, it is preferred that the optical structure of the zoom lens is as follows:

In the zoom lens having at least four lens units or, from front to rear, a first lens unit L1 of positive refractive power, a second lens unit L2 of negative refractive power, a third lens unit L3 of positive refractive power, and a fourth lens unit L4, the magnification being varied from the wide angle side to the telephoto side by moving the aforesaid first lens unit L1 forward and also moving the aforesaid third lens unit L3, the aforesaid second lens unit L2 has five lenses, or a meniscus-shaped negative lens of forward convexity, a negative lens, a positive lens whose rear surface is convex, a negative lens and a positive lens, and the following conditions are satisfied:

$$0.42 < |f_2|/f_W\ 0.78 \qquad (1)$$

$$-1.4 < \beta_{3W} < -0.7 \qquad (2)$$

$$0.45 < Z_3/Z < 0.8 \qquad (3)$$

where $f_2$ is the focal length of the aforesaid second lens unit L2, $f_W$ is the shortest focal length of the entire system, $\beta_{3W}$ and $Z_3$ are respectively the image magnification in the wide angle end and the share of contribution to the magnification change of the aforesaid third lens unit L3, and Z is the ratio of magnification change of the entire system.

In this embodiment, of the four lens units having the prescribed refractive powers, at least two or the first and third lens units L1 and L2 are made to move for varying the image magnification, whereby the magnification change is performed with high efficiency, and as the prescribed magnification change ratio is obtained by a lesser amount of movement, a minimization of the size of the entire lens system is achieved. Particularly by moving the first lens unit L1 forward, the magnification changing effect by the second lens unit L2 is heightened to easily achieve a high magnification change ratio. And, when changing the magnification, the second lens unit L2 of negative refractive power is moved or held stationary. By constructing this lens unit with five lenses having prescribed forms, off-axis aberrations such as astigmatism and coma are well corrected, and the principal point position within the second lens unit L2 is properly set so that the wasteful air spaces between it and the adjacent lens units are removed to achieve a minimization of the size of the lens system as a whole.

Of these, the meniscus-shaped negative lens is effective for reducing the negative distortion on the wide angle side. And, at least first two of the negative lens, positive lens and negative lens are cemented together to correct higher order curvature of field which increases very largely on the wide angle side, and to reduce the distortion which increases in the negative direction. Also, if the cemented lens surface of the negative lens and the positive lens is made convex toward the front, good correction of astigmatism and coma can be performed. The negative lens with both lens surfaces when properly bent effectively corrects coma. And, the front lens surface of the positive lens is made the convex form toward the front to reduce the amount of spherical aberration produced on the telephoto end.

Inequalities of condition (1) concern the refractive power of the second lens unit L2, and are to well correct off-axis aberrations, particularly distortion while achieving a shortening of the total length of the lens. When the refractive power of the second lens unit L2 becomes strong beyond the lower limit, though the total length of the lens becomes short, the variation of aberrations with variation of the magnification increases, and further the lens diameter of the first lens unit L1 comes to increase. Also, when the refractive power of the second lens unit L2 becomes weak beyond the upper limit, though the aberration correction becomes wholly easy, the total length of the lens becomes longer, and the separation between the second lens unit L2 and the third lens unit L3 must be widened on the wide angle side. So the size of the entire lens system is increased objectionably.

Inequalities of condition (2) concern the image magnification of the third lens unit L3 on the wide angle side. When the positive refractive power becomes strong beyond the lower limit, as the absolute value of the image magnification comes to be larger, though the distance from the third lens unit L3 to the image plane becomes short, the variation of spherical aberration and coma with variation of the magnification becomes large and good correction of this becomes difficult. Also, when the image magnification becomes large beyond the upper limit to the positive direction, the magnification changing effect decreases. So, to obtain the desired magnification change ratio, the amount of movement of the lens unit must be increased. As a result, the total length of the lens increases, and further correction of off-axis aberrations becomes difficult so that the optical performance in the margin of the image frame comes to lower.

Inequalities of condition (3) are to properly set the magnification change share of the third lens unit L3 to the entire system, in other words, the ratio of where $\beta_{3W}/\beta_{3T}$ and $\beta_{3T}$ are the image magnifications of the third lens unit L3 in the wide angle and telephoto ends respectively, and to perform good aberration correction over the entire range of variation of the magnification.

When the magnification change share of the third lens unit L3 becomes lesser beyond the lower limit of the inequalities of condition (3), the magnification change shares of the first lens unit L1 and the second lens unit L2 must be made much. As a result, the amount of movement of the first lens unit L1 increases causing the total length of the lens to become longer, and the refractive powers of the first and second lens units L1, L2 must be strengthened, so that the variation of aberrations with variation of the magnification comes to be large. Also, when the magnification change share of the third lens unit L3 is made large beyond the upper limit of the inequalities of condition (3), the refractive power of the third lens unit L3 must be strengthened. So, the variation of aberration with variation of the magnification becomes large. It becomes difficult to well correct this.

The basic aberration state is achieved by letting the above various conditions be satisfied. But, to perform further good aberration correction, it is preferred to satisfy the following conditions:

$$3.2 < R_{2\text{-}1}/R_{2\text{-}2} < 10.7 \quad (4)$$

$$|R_{2\text{-}6}| > |R_{2\text{-}7}|, \text{ or}$$

$$|R_{2\text{-}7}| > |R_{2\text{-}8}| \quad (5)$$

where $R_{2\text{-}i}$ is the radius of curvature of the i-th lens surface of the second lens unit L2.

Inequalities of condition (4) concern the refractive power of the frontmost negative lens, and are to properly set the principal point position of the second lens unit L2, and to achieve a reduction of the diameter of the front lens unit. When the upper limit is exceeded, the negative distortion increases on the wide angle side. Also when the lower limit is exceeded, the diameter of the front unit increases.

An inequality of condition (5) is to make the air lens between the rear negative lens and the rearmost positive lens the positive refractive power, and to prevent overcorrection of spherical aberration within the second lens unit L2 so that the spherical aberration is well corrected.

Further, in the present invention, it is preferred to satisfy the following conditions:

$$\nu_{2\text{-}2} - \nu_{2\text{-}3} > 0$$

$$\nu_{2\text{-}5} < 35 \quad (6)$$

$$N_{2\text{-}2} - N_{2\text{-}3} > 0.1 \quad (7)$$

where $N_{2\text{-}i}$ and $\nu_{2\text{-}i}$ are the refractive index and Abbe number of the glass of the i-th lens of the second lens unit L2.

Inequalities of condition (6) concern the difference between the dispersions of the negative lens and the positive lens and the dispersion of the positive lens, and are to well correct longitudinal chromatic aberration and lateral chromatic aberration. When those conditions are violated, it becomes difficult to correct these chromatic aberrations in good balance.

An inequality of condition (7) concern the difference between the refractive indices of the negative lens and the positive lens when cemented together, and is to hold the Petzval sum at a proper value, and to well correct color spherical aberration. When that condition is violated, the curvature of field increases, and the color spherical aberration also increases.

In this embodiment, it is preferred on aberration correction that focusing is performed by moving the third lens unit L3, or by moving the third lens unit L3 and the fourth lens unit L4 as a unit or independently at different speeds from each other.

In case when, as in the prior art, the focusing is performed by the first lens unit L1, there is need to correct the first lens unit L1 in itself alone for aberrations. As a result, it was not favorable to the aberration correction by the second lens unit L2 and those that follow. However, when the focusing is not performed by the first lens unit L1 it becomes possible to compensate for the under-corrected amount of aberration in the second lens unit L2 or third lens unit L3 and the change amount of aberration due to the change of the magnification by producing aberrations of the reverse sign from the first lens unit L1 so that the entire system is well corrected for aberrations.

In order to perform focusing by the third lens unit L3, it is required that the image magnification of the third lens unit L3 does not take a value of $-1$, or $+1$, or thereabout throughout the entire range of variation of the magnification.

For this reason, in this embodiment, the inequalities of condition (2) are made to satisfy. Particularly it is preferred on aberration correction that as the magnification varies toward the telephoto end, the absolute value of the image magnification is increased monotonously. The inequalities (2) and (3) are made to satisfy this condition. A numerical example 4 to be described later uses the third lens unit L3 in focusing, and the forward movement of the lens unit is almost constant throughout the entire range of variation of the magnification.

When the focusing is performed by moving the third lens unit L3 and the fourth lens unit L4 either in unison or independently, if the image magnification of the composite system is made to satisfy the abovedescribed conditions, it becomes possible to focus in exactly the same way.

In a numerical example 5 to be described later, the third lens unit L3 and the fourth lens unit L4 are made to move in unison when focusing is performed.

For note, in this embodiment, it is preferred that the first lens unit L1 is provided with a contact surface of a negative lens and a positive lens cemented together, for chromatic aberrations, spherical aberration and coma are well corrected on the telephoto side.

Also, it is better that at least two positive lenses are successively arranged in the third lens unit L3 so that the incident light beam is gradually refracted, for the amount of spherical aberration and coma produced is reduced and the variation of aberrations with variation of the magnification is lessened. And, it is preferred that they are followed by a cemented lens consisting of a positive lens and a negative lens, for the variation of spherical aberration, astigmatism and chromatic aberration with variation of the magnification is lessened.

For note, the negative lens and the positive lens of the second lens unit L2 may be constructed by a cemented lens of a positive lens and a negative lens. Also, the last positive lens may be constructed from two or more positive lenses.

In this embodiment, the case consisting of four lens units has been illustrated. But, a new lens unit may be added to the rear of the fourth lens unit L4 and may be made to move, for example, when focusing.

Numerical Example 4
(FIG. 12, FIGS. 14A–14C)
F = 36.0–102.51  FNO = 1:3.6–4.6  2ω = 62°–24°

| | R | D | N | ν |
|---|---|---|---|---|
| 1 | 190.54 | 2.25 | 1.80518 | 25.4 |
| 2 | 69.68 | 6.00 | 1.65160 | 58.6 |
| 3 | −182.17 | 0.15 | 1. | |
| 4 | 39.77 | 3.90 | 1.65160 | 58.6 |
| 5 | 66.06 | variable | 1. | |
| 6 | 91.50 | 1.20 | 1.80400 | 46.6 |
| 7 | 17.51 | 5.79 | 1. | |
| 8 | −43.13 | 1.10 | 1.80400 | 46.6 |
| 9 | 35.48 | 6.20 | 1.66680 | 33.0 |
| 10 | −13.19 | 1.10 | 1.80610 | 40.9 |
| 11 | −420.22 | 0.30 | 1. | |
| 12 | 56.10 | 2.20 | 1.80518 | 25.4 |
| 13 | −474.00 | variable | 1. | |

-continued

Numerical Example 4
(FIG. 12, FIGS. 14A-14C)
F = 36.0–102.51  FNO = 1:3.6–4.6  2ω = 62°–24°

| | | | | |
|---|---|---|---|---|
| 14 | 45.95 | 2.64 | 1.62299 | 58.2 |
| 15 | −343.88 | 0.10 | 1. | |
| 16 | 35.44 | 2.52 | 1.60311 | 60.7 |
| 17 | 129.63 | 0.10 | 1. | |
| 18 | 27.48 | 3.20 | 1.60311 | 60.7 |
| 19 | 62.26 | 0.10 | 1. | |
| 20 | 17.48 | 3.84 | 1.53172 | 48.9 |
| 21 | 64.05 | 1.23 | 1.84666 | 23.9 |
| 22 | 13.87 | 3.99 | 1. | |
| 23 | −158.44 | 2.68 | 1.60342 | 38.0 |
| 24 | −42.35 | variable | 1. | |
| 25 | −23.38 | 1.50 | 1.80400 | 46.6 |
| 26 | −27.67 | 4.00 | 1.62374 | 47.1 |
| 27 | −24.22 | | 1. | |

R 23: Aspherical Surface
$B = 1.6327 \times 10^{-5}$
$C = 5.806 \times 10^{-8}$
$D = -5.126 \times 10^{-10}$
$E = 3.28 \times 10^{-12}$

| f | 36 | 67.12 | 102.51 |
|---|---|---|---|
| D5 | 1.41 | 15.46 | 24.27 |
| D13 | 17.14 | 7.89 | 2.28 |
| D24 | 4.17 | 16.17 | 24.17 |

Numerical Example 5
F = 29.0–102.1  FNO = 1:3.6–4.6  2ω = 73.4°–24°

| | R | D | N | ν |
|---|---|---|---|---|
| 1 | 12430.33 | 2.25 | 1.80518 | 25.4 |
| 2 | 81.19 | 6.00 | 1.69680 | 55.5 |
| 3 | −216.00 | 0.15 | 1. | |
| 4 | 40.92 | 4.50 | 1.62299 | 58.2 |
| 5 | 217.50 | variable | 1. | |
| 6 | 99.55 | 1.20 | 1.80400 | 46.6 |
| 7 | 16.95 | 7.79 | 1. | |
| 8 | −62.59 | 1.20 | 1.80400 | 46.6 |
| 9 | 54.75 | 5.42 | 1.72825 | 28.5 |
| 10 | −26.43 | 0.67 | 1. | |
| 11 | −22.28 | 1.20 | 1.80400 | 46.6 |
| 12 | 184.82 | 0.15 | 1. | |
| 13 | 44.02 | 2.00 | 1.80518 | 25.4 |
| 14 | 265.69 | variable | 1. | |
| 15 | 51.11 | 3.26 | 1.60311 | 60.7 |
| 16 | 282.26 | 0.16 | 1. | |
| 17 | 37.99 | 3.51 | 1.60311 | 60.7 |
| 18 | 146.07 | 0.10 | 1. | |
| 19 | 27.10 | 4.10 | 1.60311 | 60.7 |
| 20 | 98.66 | 0.10 | 1. | |
| 21 | 21.22 | 3.44 | 1.58144 | 40.7 |
| 22 | 741.68 | 2.65 | 1.84666 | 23.9 |
| 23 | 16.15 | 5.31 | 1. | |
| 24 | 202.65 | 2.73 | 1.58144 | 40.7 |
| 25 | −109.82 | variable | 1. | |
| 26 | 52.82 | 1.10 | 1.80610 | 40.9 |
| 27 | 42.67 | 2.00 | 1.60311 | 60.7 |
| 28 | 90.10 | | 1. | |

R25: Aspherical Surface
$B = 1.6955 \times 10^{-5}$
$C = 6.0967 \times 10^{-8}$

| f | 29.0 | 69.2 | 102.1 |
|---|---|---|---|
| D5 | 0.57 | 16.10 | 19.62 |
| D14 | 22.80 | 8.15 | 2.26 |
| D25 | 3.05 | 7.08 | 11.12 |

Numerical Example 6
F = 29.0–102.1  FNO = 1:3.6–4.6  2ω = 73.4°–24°

| | R | D | N | ν |
|---|---|---|---|---|
| 1 | 253.34 | 2.25 | 1.80518 | 25.4 |
| 2 | 80.04 | 5.80 | 1.60311 | 60.7 |
| 3 | −181.46 | 0.15 | 1. | |
| 4 | 42.24 | 3.90 | 1.60311 | 60.7 |
| 5 | 88.65 | variable | 1. | |
| 6 | 64.97 | 1.20 | 1.80400 | 46.6 |
| 7 | 15.12 | 7.67 | 1. | |
| 8 | −44.41 | 1.10 | 1.80400 | 46.6 |
| 9 | 45.34 | 5.48 | 1.66680 | 33.0 |
| 10 | −12.38 | 1.10 | 1.80610 | 40.9 |
| 11 | −750.51 | 0.30 | 1. | |
| 12 | 50.98 | 2.20 | 1.80518 | 25.4 |
| 13 | −971.36 | variable | 1. | |
| 14 | 47.13 | 2.92 | 1.62299 | 58.2 |
| 15 | −334.87 | 0.10 | 1. | |
| 16 | 35.85 | 3.45 | 1.62299 | 58.2 |
| 17 | 120.75 | 0.10 | 1. | |
| 18 | 27.09 | 3.28 | 1.60311 | 60.7 |
| 19 | 65.43 | 0.10 | 1. | |
| 20 | 17.31 | 4.15 | 1.51742 | 52.4 |
| 21 | 81.80 | 1.15 | 1.84666 | 23.9 |
| 22 | 13.75 | 2.76 | 1. | |
| 23 | 276.49 | 2.24 | 1.59551 | 39.2 |
| 24 | −38.99 | variable | 1. | |
| 25 | −19.64 | 1.10 | 1.80400 | 46.6 |
| 26 | −125.03 | 4.00 | 1.62374 | 47.1 |
| 27 | −19.73 | | 1. | |

R 24: Aspherical Surface
$B = 1.6454 \times 10^{-5}$
$C = 1.6005 \times 10^{-8}$
$D = -3.286 \times 10^{-11}$
$E = 2.6072 \times 10^{-12}$

| f | 29.0 | 64.30 | 102.1 |
|---|---|---|---|
| D5 | 0.17 | 18.36 | 27.83 |
| D13 | 19.52 | 7.23 | 1.69 |
| D24 | 5.91 | 19.30 | 28.22 |

What is claimed is:

1. A zoom lens comprising at least two lens units for variation of magnification axially movable for zooming, a lens unit of negative refractive power arranged on the image side of these lens units for variation of magnification to be stationary during zooming, whereby said lens unit of negative refractive power and at least one unit of said lens units for variation of magnification are simultaneously moved axially to perform focusing, said zoom lens satisfying the condition:

$1 - \beta_{FT}2 \simeq (f_T/f_W)^2(1 - \beta_{FW})^2$.

2. A zoom lens according to claim 1, wherein of said lens units for variation of magnification, the lens unit movable for focusing is the image side arranged lens unit.

3. A zoom lens according to claim 1, wherein of said lens units for variation of magnification, the lens units movable for focusing are the lens units arranged adjacent to each other on the image side.

4. A zoom lens according to claim 3, wherein the composite refractive power of said lens units arranged adjacent to each other is positive.

5. A zoom lens according to claim 1, wherein the one of said lens units for variation of magnification which also moves for focusing has a positive refractive power.

6. A zoom lens according to claim 1, wherein the one of said lens units for variation of magnification which also moves for focusing is positioned more front when on the telephoto side of zooming than when on the wide angle side.

7. A zoom lens according to claim 1, wherein the lens unit are movable for zooming move as a unit.

8. A zoom lens comprising, from front to rear, a first lens unit of positive refractive power, a second lens unit of negative refractive power, a third lens unit of positive refractive power, and a last lens unit of negative refractive power, at least said first lens unit and said third lens unit moving axially for zooming, the following conditions being satisfied:

$$0.42 < |f_2|/f_W < 0.78$$

$$0.45 < Z_3/Z < 0.8$$

where $f_2$ is the focal length of said second lens unit, $f_W$ is the shortest focal length of the entire system, $Z_3$ is the magnification change share of the third lens unit in the wide angle end, and $Z$ is the magnification change ratio of the entire system, whereby said third lens unit and said last lens unit move simultaneously for focusing.

9. A zoom lens according to claim 8, further satisfying $$-1.4 < \beta_{3W} < -0.7$$

where $\beta_{3W}$ is the image magnification of said third lens unit in the wide angle end.

10. A zoom lens comprising, from front to rear, a first lens unit of positive refractive power, a second lens unit of negative refractive power, a third lens unit of positive refractive power, and a last lens unit of negative refractive power, wherein said second lens unit comprises a meniscus-shaped first negative lens, a second negative lens, a third positive lens whose rear lens surface is convex, a fourth negative lens and a fifth positive lens, at least said first lens unit and said third lens unit moving axially for zooming, the following conditions being satisfied:

$$0.42 < |f_2|/f_W < 0.78$$

$$0.45 < Z_3/Z < 0.8$$

where $f_2$ is the focal length of said second lens unit, $f_W$ is the shortest focal length of the entire system, $Z_3$ is the magnification change share of the third lens unit in the wide angle end, and $Z$ is the magnification change ratio of the entire system, whereby said third lens unit and said last lens unit move simultaneously for focusing.

11. A zoom lens according to claim 1, satisfying the following conditions:

$$3.2 < R_{2\text{-}1}/R_{2\text{-}2} < 10.7$$

$$|R_{2\text{-}6}| > |R_{2\text{-}7}|$$

where $R_{2\text{-}1}$ and $R_{2\text{-}2}$ are the radii of curvature of the front and rear surfaces of said first negative lens respectively, and $R_{2\text{-}6}$ and $R_{2\text{-}7}$ are the radii of curvature of the rear surface of said fourth negative lens and the front surface of said fifth positive lens respectively.

12. A zoom lens according to claim 1, satisfying the following conditions:

$$\nu_{2\text{-}2} - \nu_{2\text{-}3} > 0$$

$$\nu_{2\text{-}5} < 35$$

$$N_{2\text{-}2} - N_{2\text{-}3} > 0.1$$

where $\nu_{2\text{-}2}$, $\nu_{2\text{-}3}$ and $\nu_{2\text{-}5}$ are the Abbe numbers of said second negative lens, third positive lens and fifth positive lens respectively, and $N_{2\text{-}2}$ and $N_{2\text{-}3}$ are the refractive indices of said second negative lens and third positive lens respectively.

13. A zoom lens comprising, from front to rear, a first lens unit of positive refractive power, a second lens unit of negative refractive power, a third lens unit of positive refractive power and a fourth lens unit, the magnification varying from the wide angle side to the telephoto side by moving said first lens unit forward and also moving said third lens unit, whereby said second lens unit has a meniscus-shaped negative lens of forward convexity, a negative lens, a positive lens whose rear surface is convex, a negative lens, and a positive lens, and the following conditions are satisfied:

$$0.42 < |f_2|/f_W < 0.78$$

$$-1.4 < \beta_{3W} < -0.7$$

$$0.45 < Z_3/Z < 0.8$$

where $f_2$ is the focal length of said second lens unit, $f_W$ is the shortest focal length of the entire system, $\beta_{3W}$ and $Z_3$ are respectively the image magnification and the magnification change share of said third lens unit in the wide angle end, and $Z$ is the magnification change ratio of the entire system.

* * * * *

UNITED STATES PATENT AND TRADEMARK OFFICE
CERTIFICATE OF CORRECTION

PATENT NO. : 4,776,680

DATED : October 11, 1988

INVENTOR(S) : TSUNEFUMI TANAKA

It is certified that error appears in the above-identified patent and that said Letters Patent is hereby corrected as shown below:

Column 1, line 12, "for" should be deleted;

line 60, "amied" should read --aimed--.

Column 2, line 25, "a" should be deleted.

Column 4, line 6, "being" should read --are--.

Column 5, line 30, "following" should read --following,--.

Column 8, line 48, "and" should read --wherein $\beta_{3W}$ and--.

Column 12, line 64, "move" should be deleted.

Column 13, line 44, "1" should read --10--.

UNITED STATES PATENT AND TRADEMARK OFFICE
CERTIFICATE OF CORRECTION

PATENT NO. : 4,776,680

DATED : October 11, 1988

INVENTOR(S) : TSUNEFUMI TANAKA

It is certified that error appears in the above-identified patent and that said Letters Patent is hereby corrected as shown below:

Column 14, line 10, "1" should read --10--.

Signed and Sealed this

Tenth Day of January, 1989

Attest:

DONALD J. QUIGG

*Attesting Officer*  *Commissioner of Patents and Trademarks*